United States Patent [19]

Murayama

[11] Patent Number: 5,156,821
[45] Date of Patent: Oct. 20, 1992

[54] REACTOR FOR REFORMING HYDROCARBON

[75] Inventor: Katsutoshi Murayama, Niigata, Japan

[73] Assignee: Mitsubishi Gas Chemical Company, Inc., Tokyo, Japan

[21] Appl. No.: 685,180

[22] Filed: Apr. 15, 1991

Related U.S. Application Data

[63] Continuation of Ser. No. 375,346, Jul. 5, 1989, abandoned.

[30] Foreign Application Priority Data

Jul. 7, 1988 [JP] Japan .................................. 167698

[51] Int. Cl.$^5$ .............................................. B01J 8/06
[52] U.S. Cl. ..................................... 422/191; 422/194; 422/197; 422/211; 422/221
[58] Field of Search ............... 422/148, 189, 190, 191, 422/194, 197, 198, 312, 221, 211

[56] References Cited

U.S. PATENT DOCUMENTS

| | | | |
|---|---|---|---|
| 3,372,988 | 9/1964 | Hansen | 422/218 |
| 3,909,299 | 9/1975 | Corrigan | 422/211 |
| 3,948,610 | 4/1976 | Sutcliffe et al. | 422/172 |
| 4,230,669 | 10/1980 | Eagle et al. | 422/191 |
| 4,650,651 | 3/1987 | Fuderer | 422/191 |
| 4,666,680 | 5/1987 | Lewis | 422/191 |
| 4,784,218 | 11/1988 | Holl | 422/312 |
| 4,904,455 | 2/1990 | Karafian et al. | 422/197 |
| 5,019,356 | 5/1991 | Silberring | 422/198 X |
| 5,112,578 | 5/1992 | Murayama et al. | 422/197 |

FOREIGN PATENT DOCUMENTS

| | | |
|---|---|---|
| 8321604 | 11/1983 | Australia . |
| 1076361 | 4/1980 | Canada . |
| 82691 | 7/1978 | Japan . |
| WO88/01983 | 3/1988 | PCT Int'l Appl. . |
| 1047627 | 11/1966 | United Kingdom . |
| 1316886 | 5/1973 | United Kingdom . |
| 2153382A | 8/1985 | United Kingdom . |
| 2199841A | 7/1988 | United Kingdom . |

Primary Examiner—James C. Housel
Assistant Examiner—Jeffrey R. Snay
Attorney, Agent, or Firm—Wenderoth, Lind & Ponack

[57] ABSTRACT

A reactor for the reforming of hydrocarbons by a steam reforming reaction and a partial oxidation reaction, which comprises an upper tube sheet disposed in an upper portion of the reactor, a plurality of reaction tubes packed with a catalyst and suspended perpendicularly from the upper tube sheet, a lower tube sheet disposed where lower portions of the reaction tubes are positioned, an internal cylinder suspended perpendicularly from the lower tube sheet, an oxygen distributor disposed in an upper portion of the internal cylinder and connected to a feed tube of an oxygen-containing gas which is fed from an exterior of the reactor, a catalyst-packed bed disposed in the lower portion of the internal cylinder, a flow path for feeding a mixture gas of hydrocarbon with steam disposed above the upper tube sheet, and a flow path for recovering reformed gas disposed below the upper tube sheet. Also provided is a process for the reforming of hydrocarbons by a steam reforming reaction and a partial oxidation reaction.

6 Claims, 1 Drawing Sheet

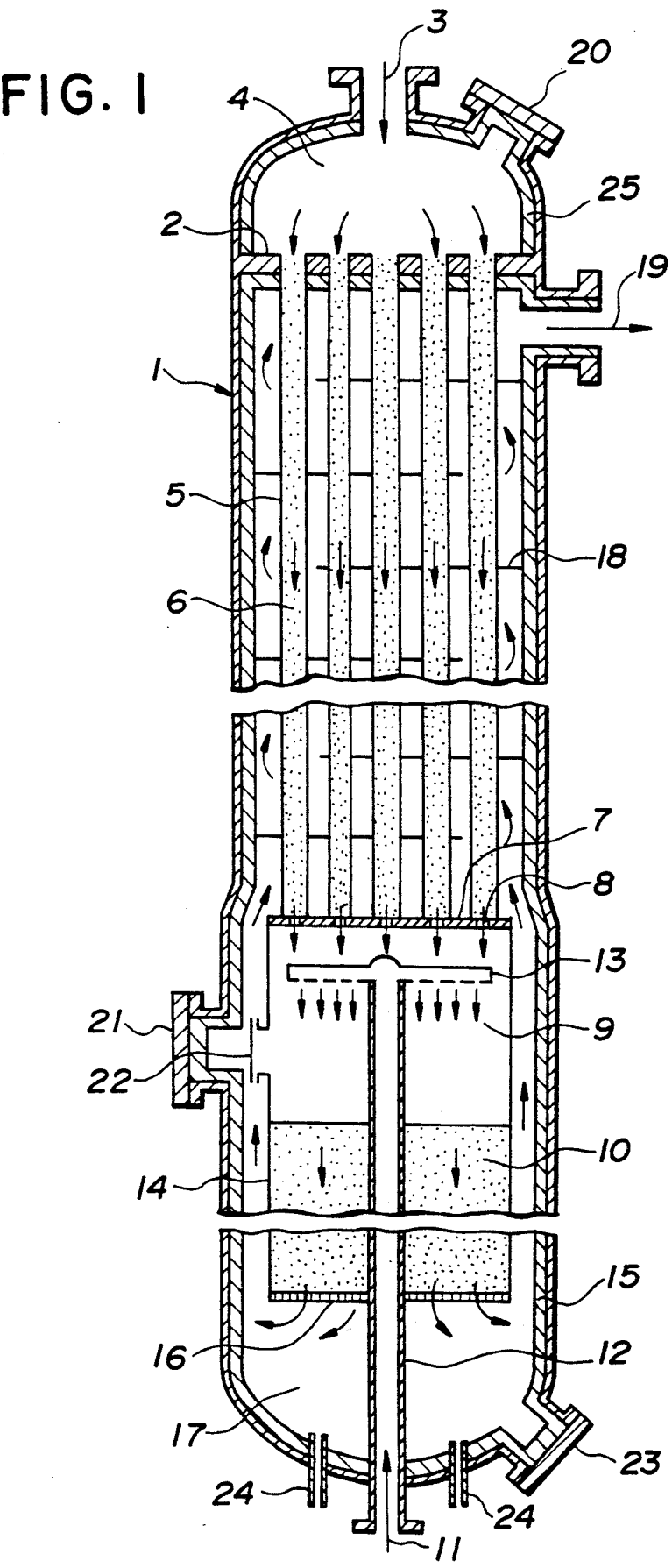
FIG. I

REACTOR FOR REFORMING HYDROCARBON

This application is a continuation of now abandoned application Ser. No. 07/375,346 filed on Jul. 5, 1989.

FIELD OF THE INVENTION

This invention relates to a reactor for producing a reformed gas from hydrocarbons by a reforming reaction with steam and partial oxidation, and a process for the reforming reaction.

A reformed gas from hydrocarbons containing hydrogen and carbon oxides ($CO+CO_2$) as main components is used in many industries using hydrogen, i.e., reformed gas is used as a gas for synthesis of ammonia and methanol, as hydrogenated gas for various chemical reactions, as city gas, as gas for fuel battery, and the like.

DESCRIPTION OF PRIOR ART

The reforming of hydrocarbons is carried out mainly by the following two processes.

(1) Steam reforming process

A mixture gas of hydrocarbon with steam is subjected to the following reforming reaction with steam at 5 to 40 atmospheres and temperature of from 700° to 900° C. by heating a catalyst-filled reaction tube in a combustionn heating furnace.

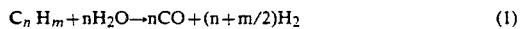
$$C_n H_m + nH_2O \rightarrow nCO + (n+m/2)H_2 \quad (1)$$

$$CO + H_2O \rightarrow CO_2 + H_2 \quad (2)$$

The above process makes it possible to effectively obtain hydrogen, etc., from hydrocabon by using a steam recovered in an apparatus.

(2) Partial oxidation process

An oxygen-containing gas is introduced into a mixture gas of hydrocarbon with steam to combust part of the hydrocarbon, and the steam reforming reaction is carried out by heat generated from the combustion.

The above process requires no external heating, and therefore can be carried out in a pressure vessel having a simple structure. A catalyst is sometimes used, and sometimes not. A reactor for this process uses a lining of a heat-insulation material, and the reaction is carried out at high temperature and under high pressure. The yield of carbon oxides ($CO+CO_2$) by this process is generally larger than that obtained by the steam reforming process.

Further, the reforming reaction is also carried out by a combination of the above two processes.

For example, in an apparatus for producing ammonia, at first, hydrocarbons are reformed according to a steam reforming process and then a partial oxidation reaction is carried out by introducing air to the resultant reformed gas to obtain a reformed gas having a hydrogen/nitrogen molar ratio of 3/1.

Canadian Patent No. 1076361 also describes a process using a combination of a steam reforming process with a partial oxidation process to obtain a reformed gas having a composition suitable for methanol synthesis.

Further, Japanese Laid-Open Patent Publication No. 82691/1978 describes a process which comprises heating a reaction tube of heat-exchanger type by using a reformed gas coming from a reactor for partial oxidation and having a higher temperature. Australian Patent No. 8321604 describes a process which comprises carrying out a steam reforming reaction in a catalyst-filled reaction tube within a reactor, then carrying out a partial oxidation reaction and heating the catalyst-filled reaction tube with the resultant gas.

U.S. Pat. No. 4,666,680 describes a reactor having a structure suited for collecting a gas from upper reforming reaction tubes into a lower portion of a reactor to carry out a partial oxidation reaction, carrying out a reforming reaction of the partially oxidized gas with a catalyst layer thereabove and then heating the upper reforming reaction tubes with the resultant reformed gas.

In the steam reforming process, a reaction tube is required to be heated uniformly by a combustion gas having a high temperature of about 1,000° C., and it is therefore necessary to use an expensive material, e.g. nickel, chromium, molybdenum, niobium or the like, in the reaction tube. And the heat efficiency that can be obtained in the reforming furnace of this process is only 50 to 55%. Therefore, the steam reforming process requires the use of a large amount of a fuel and high costs for heat-recovery equipment.

Further, in order to heat a catalyst uniformly, it is necessary to provide many reaction tubes and burners. As a result, the size of a reforming furnace increases, and the manufacturing of a large scale apparatus for that process is difficult and leads to high costs.

The partial oxidation reaction is carried out within a simply structured pressure container under high pressure. Therefore, neither expensive reaction tubes nor complicated burners are necessary, and its heat loss is small. Since, however, a combustion gas is included in a reformed gas, high-purity oxygen is required for combustion in apparatus other than an apparatus for producing ammonia in which nitrogen is used as a material.

For the above reason, a device for separating oxygen from air is necessary and therefore, the costs for construction of the device and required power are large. Further, since hydrogen is combusted in the partial oxidation reaction, the reformed gas has a low concentration of hydrogen and a high concentration of carbon oxides ($CO+CO_2$).

In a process using a combination of a steam reforming process and a partial oxidation process, it is possible to obtain a reformed gas suitable for reactions using hydrogen and carbon oxides ($CO+CO_2$) as materials, such as a reaction for methanol synthesis. Further, in this combination process, the problems of the above two processes are mutually reduced. However, the combination process of prior art has the following problems.

First, Canadian Patent No. 1076361 describes an apparatus for producing methanol, which is a combination, in the same way as in an apparatus for producing ammonia, of a primary reformation furnace according to the steam reforming process and a secondary reforming furnace according to the partial oxidation process. This apparatus requires a device for separating oxygen from air, expensive reaction tubes and a heat recovery device, and therefore requires high construction costs, and the improvement in heat efficiency is small.

Japanese Laid-Open Patent Publication No. 82691/1978 describes a process in which reaction tubes for steam reforming reaction are provided within a pressure vessel and heated by a partial oxidation gas having a high temperature. In this process, the stress by the elongation of the reaction tubes due to being heated is absorbed by using narrow bent tubes. Since, however, many narrow tubes are provided within a pressure vessel, it is considerably difficult to manufacture an apparatus having many reaction tubes, and it is very difficult to check or repair the narrow tubes after the apparatus is manufactured. As the small tubes contact with the high temperature gas, the small tube portion is where troubles are most likely to occur.

Australian Patent No. 8321604 solves the above problem of damages which the elongation causes on reaction tubes. However, after the steam reforming reaction is carried out in the reaction tubes, the partial oxidation reaction is carried out by contacting the resultant reaction gas to oxygen gas. Therefore, the temperature in this gas contact portion goes very high, and there is a risk of causing breakage of reaction tubes and forming free carbon.

In the reactor of U.S. Pat. No. 4,666,680, since a partially oxidized gas is passed over a catalyst layer upwardly, the catalyst is fluidized and likely to be worn out into powders, and although a thermal elongation of reforming tubes is absorbed by employing the sliding of an upper tube sheet, the sliding tube sheet has a large area and therefore makes it difficult to absorb the thermal elongation uniformly, and breakage of the reforming reaction tubes is likely to occur because of thermal stress.

SUMMARY OF THE INVENTION

It is an object of the present invention to provide an improved reforming reactor for carrying out both a steam reforming reaction and partial oxidation reaction of hydrocarbons in one reactor and a process for a reforming reaction of hydrocarbons.

It is another object of the present invention to provide an improved reforming reactor for carrying out a steam reforming reaction of hydrocarbons in two steps and a process for a reforming reaction of hydrocarbons.

It is another object of the present invention to provide a reforming reactor which can be manufactured easily and constructed at low costs.

It is another object of the present invention to provide a reforming reactor in which a risk of reaction tube breakage and leakage can be reduced and in which the wall thickness of the reaction tube can be reduced and the apparatus costs can be therefore reduced.

It is another object of the present invention to provide a reforming reactor which makes it possible to prevent a damage from being caused by thermal stress produced at a high temperature.

It is another object of the present invention to provide a reforming reactor and a reforming reaction process which can prevent free carbon from being formed.

According to the present invention there is provided a reactor for the reforming of hydrocarbons by a steam reforming reaction and a partial oxidation reaction, which comprises;

(a) an upper tube sheet disposed in the upper portion of the reactor, a plurality of reaction tubes packed with a catalyst and suspended perpendicularly from the upper tube sheet, a lower tube sheet disposed where the lower portions of the reaction tubes are positioned, (b) an internal cylinder suspended perpendicularly from the lower sheet tube, an oxygen distributor disposed in the upper portion of the internal cylinder and connected to a feed tube of an oxygen-containing gas which is fed from the exterior of the reactor, (c) a catalyst-packed bed disposed in the lower portion of the internal cylinder, (d) a flow path for feeding a mixture gas of hydrocarbon with steam disposed above the upper tube sheet, and a flow path for recovering reformed gas disposed below the upper tube sheet, whereby (e) the mixture gas is fed from above the reaction tubes to the reaction tubes to carry out the steam reforming reaction, (f) the oxygen-containing gas is fed into the internal cylinder through the oxygen distributor to carry out the partial oxidation reaction of partially reformed gas fed into the internal cylinder through the reaction tubes, (g) the steam reforming reaction of the partially oxidized gas is carried out in the catalyst-packed bed disposed in the lower portion of the internal cylinder, (h) reformed gas having passed through the catalyst-packed bed disposed in the lower portion of the internal cylinder rises along the outside of the reaction tubes to heat the reaction tubes, and the reformed gas is recovered from the reactor.

Further, according to the present invention, there is provided a process for the reforming of hydrocarbons by a steam reforming reaction and a partial oxidation reaction, which comprises mixing a mixture gas of hydrocarbon and steam with part of a purge gas extracted from a methanol or ammonia synthesis gas or with other hydrogen-containing gas, and feeding the mixture into a reforming reactor for carrying out a steam reforming reaction and a partial oxidation reaction in one reactor.

BRIEF DESCRIPTION OF DRAWINGS

FIG. 1 shows a cross-sectional view of a preferred embodiment of a reactor for reforming hydrocarbons in this invention.

DETAILED DESCRIPTION OF THE INVENTION

The present invention will be explained hereinbelow by referring to the drawings.

FIG. 1 shows a structure of a reactor for reforming hydrocarbons in this invention. As shown in FIG. 1, a reforming reactor 1 having a vertically cylindrical shape has a tube sheet 2 in the upper portion, and reaction tubes 5 filled with a catalyst 6 are suspended perpendicularly from the upper sheet tube 2. The reaction tubes 5 have a catalyst support plate 8 in their lower end and are fixed with a lower tube sheet 7, from which an inner cylinder 14 is perpendicularly suspended. The upper portion of the inner cylinder 14 works as a partial oxidation chamber 9, and is provided with a distributor 13 which disperses an oxygen-containing gas fed from an oxygen feed tube 12. A catalyst 10 is filled in the lower portion of the inner cylinder 14, and held on a catalyst support plate 16. The inner cylinder 14 is slidable along the major axis of the oxygen feed tube 12 thereby to compensate thermal elongation of the reaction tubes 5 and the inner cylinder 14, and the oxygen feed tube 12 works as a support which prevents vibration and sway of the reaction tubes 5 and the inner cylinder 14. The reforming reactor 1 and the inner cylinder 14 are provided, in their proper places, with access ports to fill and extract a catalyst as numbered 20, 21, 22 and 23.

A mixture gas of hydrocarbon with steam is introduced through a first inlet port 3, passed through an upper chamber 4 and the catalyst 6 filled in the reaction tubes 5 to carry out the steam reforming reaction, and directed into a partial oxidation chamber 9. On the other hand, an oxygen-containing gas is introduced through a second inlet port 11, passed through the oxygen feed tube 12, and released into the partial oxidation chamber 9 through holes or slits formed in the distributor 13 to partially oxidize the reformed gas having the catalyst 6. The partially oxidized gas is introduced to a catalyst-packed bed 10 to carry out a steam reforming reaction at a high temperature under heat insulation, whereby the hydrocarbon is almost entirely reformed, and then it is directed to a lower chamber 17. The reformed gas rises through a space between the inner surface surface of the reforming reactor 1 and the inner cylinder 14, and then to a space around the outer surfaces of walls of a group of the reaction tubes forming a heat-exchanger to heat the reaction tubes 5. It is preferable to use baffleplates 18, which promote heat transfer, around the walls of the group of the reaction tubes. The reformed gas, which has imparted heat to the reaction tubes, is recovered from the reforming reactor system through an outlet port 19, and the remaining retained heat is recovered in a next step.

The interior wall of the shell of the reforming reactor 1 and the downward surface of the upper tube sheet 2 are provided with an insulating material 15 and the interior wall of the upper chamber 4 is provided with an insulating material 25 to prevent exposure of structural material to high temperatures and heat radiation.

The reforming reactor has a heating burner 24 for start-up the reforming reactor in its lower portion, and when the reactor is started, a fuel and oxygen-containing gas are fed to the burner and combusted to heat the reaction tubes.

When a steam reforming reaction and partial oxidation reaction under high pressure are carried out within one reforming reactor, free carbon is likely to occur, since a steam reforming reaction gas and an oxygen-containing gas are in contact within a narrow reactor to cause high temperatures. Hence, the free carbon formation is prevented by disposing a catalyst-packed bed immediately after a partial oxidation reactor as will be discussed later, and said formation is further prevented by incorporating a hydrogen-rich purge gas from an apparatus for methanol or ammonia synthesis or a hydrogen-containing gas from an apparatus for petroleum purification.

The steam reforming reaction in the layer packed with the catalyst 6 (catalyst-packed layer 6) is carried out mainly at a temperature of between 600° C. and 800° C., and it is therefore desirable to preheat the mixture gas of hydrocarbon with steam fed through the first inlet port 3 to a temperature of between 400° C. and 600° C.

Nickel-type catalysts are usually used for the steam reforming reaction in the catalyst-packed layer 6. Since this reaction is endothermic, the reaction proceeds with receiving heat from reformed gas outside the reaction tubes. Since the temperature of reformed gas around the upper portion of the catalyst-packed layer decreases, it is desirable to pack the upper portion with a high activity catalyst to react at a relatively low temperature.

When the reaction amount in this steam reforming reaction zone is large, the reaction amount in the subsequent partial oxidation reaction zone decreases. It is therefore preferable to select a heat transmission area of a reaction tube, a catalyst amount and a type of catalyst such that the reaction amount in the steam reforming reaction zone is made as large as possible.

An oxygen-containing gas introduced through the second inlet port 11 is directed to the partial oxidation chamber 9 through the downward holes or slits of the distributor 13 to carry out a partial oxidation reaction. The oxygen-containing gas is used for the partial oxidation reaction and remains included in reformed gas, and inert components of the oxygen-containing gas are therefore included in the reformed gas. It is therefore desirable that the oxygen-containing gas be of high purity as much as possible, except that the inert components (nitrogen) are used for a reaction such as synthesis of ammonia. A pure oxygen gas, air or gas enriched with oxygen is used depending upon its application.

In the partial oxidation reaction, hydrogen, which has a larger burning velocity, is preferentially oxidized, and the maximum temperature reaches up to between 1,400° C. and 1,700° C. Since, however, a large amount of hydrocarbon still remains, the partial oxidation reaction system here is still unstable and likely to form free carbon. A further steam reforming reaction proceeds by disposing a catalyst-packed bed in the lower portion of the partial oxidation chamber, thereby to prevent the formation of free carbon. It is preferable to use a nickel-type catalyst in the bed. Then, it is possible to obtain a composition nearly equivalent to equilibrium in a reforming reaction.

Reformed gas from the catalyst-packed bed 10 has a temperature of between 850° C. to 1,100° C., enters the lower chamber 17, turns its moving direction and rises toward a space around the reaction tubes 5 to impart heat to the reaction tubes 5. As a result, the temperature of the reformed gas decreases by 200° C. or more until the reformed gas is recovered from the outlet port 19.

With regard to reaction conditions for the reforming reactor of the present invention, in general, the pressure is between 10 and 150 atmospheres, preferably between 30 and 100 atmospheres, and the temperature at outlet portion of the reaction tube is between 650° and 750° C. The mixture gas to be fed to the catalyst-packed layer 6 of the reaction tubes has a space velocity of between 2,000 to 8,000 l/Hr and a linear velocity of between 0.5 and 2.0 m/sec.

It is desirable that not less than 15%, preferably 20 to 30%, of hydrocarbon as a material is reformed in the steam reforming zone at low temperature in the catalyst-packed layer 6. In addition, the reformation ratio of hydrocarbon as material is represented by [1.0-(hydrocarbon ($CH_4$) content in reformed gas (mole))/(carbon content (mole) in hydrocarbon as material)]×100 (%). By proceeding with the steam reforming reaction within the above range, etc., the heat of reformed gas which has passed the catalyst-packed bed 10 is recovered until its temperature in the outlet of the reactor is lower by 200° to 400° C. or it temperature is higher than the temperature of mixture gas to be fed to the reactor by about 50° to 150° C.

Gas in introduction to the catalyst-packed bed 10 has a space velocity of 2,000 to 5,000 l/Hr and a linear velocity of 0.2 to 0.5 m/sec. In the catalyst-packed bed 10, preferably, hydrocarbon is reformed up to not less than 85%, preferably not less than 90%, of hydrocarbon as a material, and for this purpose, the condition for feeding the oxygen-containing gas is adjusted such that the temperature of reformed gas in the outlet portion of the catalyst-packed bed is 850° to 1,100° C.

For example, when a natural gas containing methane as a main component is used to produce reformed gas for methanol synthesis under the above conditions, the resultant reformed gas has a composition consisting of a hydrogen/carbon oxides stoichiometry ratio of 1.00–1.06 and a $CH_4$ content of not more than 3 mol %. Thus, the resultant composition is optimal for synthesis of methanol.

The reaction tube of this invention, in general, has an inner diameter of 40 to 100 mm and a length of 10 to 20 m. Examples of the material for the reaction tube include nickel, chromium, molybdenum steel, or that which is obtained by incorporating thereto a small amount of niobium, tungsten, etc. In general, the above material can be also used as a structural material for the internal cylinder 14, the oxygen feed tube 12 and the distributor 13.

EXAMPLE 1

A steam reforming reactor of this invention was used to produce a gas for synthesis of methanol by using a natural gas and purged gas from an apparatus for methanol synthesis. The main conditions for operating the reforming reactor were as follows. (The compositions of gases stand for mol %.)

| (1) Mixture gas as material: | |
|---|---|
| Feeding pressure | 39.54 kg/cm$^2$A |
| Feeding temperature | 550° C. |
| Feeding amounts: | |
| Natural gas | 2,550 kg-mole/hr |
| ($CH_4$ 89.5%, $C_2H_6$ 8.5%, $C_3H_8$ 1.5%, $N_2$ 0.5%) | |
| Purged gas | 1,000 kg-mole/hr |
| ($CH_4$ 12.0%, CO 2.5%, $CO_2$ 6.0%, $H_2$ 75.5%, $N_2$ 4.0%) | |
| Steam | 7,671 kg-mole/hr |
| (2) Oxygen gas: | |
| Feeding pressure | 37.5 kg/cm$^2$A |
| Feeding temperature | 200° C. |
| Feeding amount | 1,250 kg-mole/hr |
| ($O_2$ 99.0%, $N_2$ 1.0%) | |
| (3) Reaction tube 5, outlet: | |
| Pressure | 37.0 kg/cm$^2$A |
| Temperature | 665° C. |
| Amount of gas | 12,613 kg-mole/hr |
| (CO 1.31%, $CO_2$ 4.88%, $H_2$ 24.61%, $CH_4$ 17.88%, $N_2$ 0.42%, $H_2O$ 50.90%) | |
| (4) Catalyst-packed bed 10, outlet: | |
| Pressure | 36.0 kg/cm$^2$A |
| Temperature | 916° C. |
| Amount of gas | 16,661 kg-mole/hr |
| (CO 10.25%, $CO_2$ 6.55%, $H_2$ 42.97%, $CH_4$ 1.42%, $N_2$ 0.39%, $H_2O$ 38.42%) | |

Gas from the outlet of the catalyst-packed bed 10 imparted heat to the reaction tubes, and gas in the outlet 19 of the reforming reactor had a pressure of 35.6 kg/cm$^2$ A and a temperature of 615° C.

In the reforming reactor, about 20.3% of material hydrocarbons were reformed in the outlet of the reaction tubes 5, and the material hydrocarbons were reformed up to 91.6% in the outlet from the catalyst-packed bed 10. Thus, the resultant reformed gas was suitable for synthesis of methanol. No free carbon formation was observed at the outlets of the reaction tubes and internal cylinder.

EXAMPLE 2

A steam reforming reactor of this invention was used to produce a gas for synthesis of ammonia by using a natural gas and purged gas from an apparatus for ammonia synthesis. The main conditions for operating the reforming reactor were as follows.

| (1) Mixture gas as material: | |
|---|---|
| Feeding pressure | 97.5 kg/cm$^2$A |
| Feeding temperature | 550° C. |
| Feeding amounts: | |
| Natural gas | 2,300 kg-mole/hr |
| ($CH_4$ 89.5%, $C_2H_6$ 8.5%, $C_3H_8$ 1.5%, $N_2$ 0.5%) | |
| Purged gas | 900 kg-mole/hr |
| ($CH_4$ 8.5%, $H_2$ 64.5%, $N_2$ 21.5%, Ar 5.5% | |
| Steam | 9,203 kg mole/hr |
| (2) Oxygen-containing gas (oxygen-rich air) | |
| Feeding pressure | 95.5 kg/cm$^2$A |
| Feeding temperature | 550° C. |
| Feeding amount | 3,400 kg-mole/hr |
| ($O_2$ 33.0%, $N_2$ 66.2%, Ar 0.8%) | |
| (3) Reaction tube 5, outlet: | |
| Pressure | 95.0 kg/cm$^2$A |
| Temperature | 700° C. |
| Amount of gas | 13,724 kg-mole/hr |
| ($CO_2$ 3.91%, CO 0.90%, $H_2$ 20.65%, $CH_4$ 14.35%, $N_2$ 1.49%, Ar 0.36%, $H_2O$ 58.34%) | |
| (4) Catalyst-packed bed 10, outlet: | |
| Pressure | 94.0 kg/cm$^2$A |
| Temperature | 942° C. |
| Amount of gas | 19,381 kg-mole/hr |
| ($CO_2$ 5.61%, CO 6.52%, $H_2$ 32.03%, $CH_4$ 1.44%, $N_2$ 12.67%, Ar 0.40%, $H_2O$ 41.33%) | |

Gas from the outlet of the catalyst-packed bed 10 imparted heat to the reaction tubes, and gas in the outlet 19 of the reforming reactor had a pressure of 93.6 kg/cm$^2$ A and a temperature of 677° C.

In the reforming reactor, about 22.9% of material hydrocarbons were reformed in the outlet of the reaction tubes 5, and the material hydrocarbons were reformed more than 89% or more in the outlet of the catalyst-packed bed 10. Thus, the resultant reformed gas was suitable for synthesis of ammonia. No free carbon formation was observed at the outlets of the reaction tubes and internal cylinder.

The reforming reactor of the present invention solves the problems of prior art as follows.

(1) The steam reforming process of prior art requires an externally heating type reforming furnace of large scale, and in an apparatus for production of ammonia, it requires two reforming furnaces, externally heating type and internally heating type. In contrast, the reforming reactor of the present invention achieve the reforming process with one internally heating type reforming furnace. Since a reforming reaction is carried out under a high pressure when the internally heating type reforming furnace is used, the reforming reactor can be made small in size, and its construction costs are therefore reduced.

(2) In the reforming reactor of the present invention, reformed gas after the partial oxidation can be used as a heating medium for the reaction tubes. For this reason, the pressure difference between the reaction gas in the reaction tubes and the heating medium is small, and the wall thickness of the reaction tubes can therefore be made small. The reaction tubes are made of a highly heat-resistant and expensive material such as nickel, chromium, molybdenum, niobium, or the like. Thus, the apparatus costs can be remarkably reduced with decreasing the wall thickness of the reaction tubes.

(3) The steam reforming process of prior art uses a combustion gas having a high temperature as a heating medium, and there is therefore a risk of an explosion occuring when breakage of, or leakage from, the reaction tube occurs. In contrast, since the present invention uses reformed gas as a heating medium to heat the reaction tubes, the risk is very small when the reaction tube causes breakage or leakage.

(4) In the steam reforming apparatus of prior art, the upper and lower end portions of the reaction tubes are supported, and various devices are used to absorb thermal stress since the reaction tubes are exposed to a combustion gas having a high temperature. In contrast, in the present invention, the lower end portion of the reforming tubes or the lower end portion of the internal cylinder is not fixed, and the catalyst support plate of the catalyst-packed bed in the internal cylinder is slidable about the oxygen feed tube 12. Thus, the thermal stress problem due to high temperature can be solved.

(5) In the steam reforming reactor of the present invention, a heat evolved with the partial oxidation is directly used for the steam reforming reaction, and the amount of oxygen for the partial oxidation is reduced. The composition of reformed gas is adjusted by the partial oxidation, and it is therefore possible to obtain reformed gases having compositions suitable for various purposes, such as for synthesis of methanol, ammonia, and the like.

(6) The steam reforming reactor of the present invention is of an internally heating type and can be made small in size. Hence, the heat loss is small and the energy consumption unit is improved as compared with steam reforming reactors of prior art. Further, the steam reforming reactor of the present invention is structurally simple and therefore easy in designing and manufacturing. Hence, according to the present invention, it is possible to manufacture larger-scale steam reforming reactors than the steam reforming reactors of prior art.

(7) When a steam reforming reaction and a partial oxidation reaction are carried out within one reactor, a steam reformed gas and an oxygen-containing gas are brought into contact within a reactor having a small space, and reach a very high temperature. Hence, free carbon is likely to occur. However, in the case with the reforming reactor of the present invention, since a catalyst-packed bed for a steam reforming reaction is provided in the lower portion of the partial oxidation chamber, and since a hydrogen-containing gas, such as a purged gas extracted from an apparatus for synthesis of methanol, ammonia, or the like is mixed with hydrocarbons as a material, the formation of free carbon is prevented, and the reactor for reforming hydrocarbons can be smoothly operated for a long period of time.

What is claimed is:

1. A reactor for the reforming of hydrocarbons by a steam reforming reaction and a partial oxidation reaction, which comprises:

a reactor shell having a peripheral wall with first and second inlet ports and an outlet port formed therein;

an upper tube sheet fixed to said peripheral wall of said reactor shell within an upper portion of said reactor shell, an upper chamber being defined in said reactor shell above said upper tube sheet;

a plurality of reaction tubes mounted to and being suspended perpendicularly downwardly from said upper tube sheet;

a catalyst packed in each of said plurality of reaction tubes for carrying out a steam reforming reaction;

a lower tube sheet mounted to said plurality of reaction tubes and being spaced apart from said peripheral wall of said reactor so as to be out of contact therewith;

an internal cylinder mounted to and being suspended perpendicularly downwardly from said lower tube sheet, said internal cylinder having a partial oxidation chamber defined within an upper portion thereof for carrying out a partial oxidation reaction;

an oxygen distributor means disposed in said partial oxidation chamber for distributing an oxygen-containing gas within said partial oxidation chamber;

a feed tube slidably mounted to said internal cylinder and extending from said second inlet port to said oxygen distributor means for feeding oxygen-containing gas to said oxygen distributor means; and a catalyst-packed bed disposed in a lower portion of said internal cylinder for carrying out a steam reforming reaction;

wherein a flow path, along which a mixture gas of hydrocarbon with steam is adapted to be fed from said first inlet port to said plurality of reaction tubes, is defined in said upper chamber, and a flow path, along which reformed gas is adapted to be fed from said internal cylinder to said outlet port, is defined in said reactor shell below said upper tube sheet.

2. A reactor according to claim 1 further comprising a burner for start-up in a lower portion of the reactor shell.

3. A reactor according to claim 1 wherein said reactor shell is cylindrically formed.

4. A reactor according to claim 1 wherein the oxygen feed tube is perpendicularly extending from a bottom center portion of the reactor shell into the internal cylinder.

5. A reactor according to claim 1 further comprising baffleplates around a group of the reaction tubes.

6. A reactor according to claim 1 further comprising a heat insulating material within said reactor shell adjacent to said peripheral wall.

* * * * *